United States Patent [19]

Lashley, Jr.

[11] B 3,923,648
[45] Dec. 2, 1975

[54] DETOXIFICATION OF ALDEHYDES AND KETONES
[75] Inventor: Everett R. Lashley, Jr., South Charleston, W. Va.
[73] Assignee: Union Carbide Corporation, New York, N.Y.
[22] Filed: June 7, 1973
[21] Appl. No.: 367,739
[44] Published under the Trial Voluntary Protest Program on January 28, 1975 as document no. B 367,739.

[52] U.S. Cl. ..................... 210/12; 210/18; 210/59
[51] Int. Cl.² ..................... C02C 1/02; C02C 5/02
[58] Field of Search ............. 210/12, 18, 59, 2, 15; 195/3 R, 3 H

[56] References Cited
UNITED STATES PATENTS
3,676,334   7/1972   Zuckerman et al. .................. 210/18

OTHER PUBLICATIONS
Chem. Abstr., 133842e, Vol. 73, 1970.

*Primary Examiner*—Thomas G. Wyse
*Assistant Examiner*—Benoit Castel
*Attorney, Agent, or Firm*—Bernard Francis Crowe

[57] ABSTRACT

Wastewaters containing alpha, beta-ethylenically unsaturated aldehydes and/or ketones may be rendered non-toxic to biological treatment systems by heating the wastewaters with a slight excess of alkali at elevated temperatures.

11 Claims, No Drawings

DETOXIFICATION OF ALDEHYDES AND KETONES

BACKGROUND OF THE INVENTION

This invention pertains to the treatment of wastewaters and more particularly to the detoxification of $\alpha,\beta$-ethylenically unsaturated aldehydes and ketones in respect to biological treatment systems.

The toxicity of alpha,beta-ethylenically unsaturated aldehydes and ketones even in low concentrations to biological treatment systems has been recognized by those skilled in the art. A review article on this problem is presented by V. T. Stack, Jr. in Industrial and Engineering Chemistry, Volume 49, No. 5, page 913 (1957). In the manufacture of such compounds, the wastewaters containing these organic substances must be processed at very low concentrations if they are further treated by a biological system. If not, the biomass is in danger of being killed or inhibited to a very low level of activity. This problem is particularly acute in the treatment of wastewaters from the manufacture of acrolein, acrylic acid and acrylic acid esters.

Although disposal of toxic wastes by injection into a deep well has been used, this is a method of questionable efficiency and is not a long-term solution to the problem. Incineration of toxic wastes is also not economical because such methods are more expensive than biological oxidation and can have adverse environmental consequences.

Wastewaters containing alpha,beta-ethylenically unsaturated aldehydes or ketones have been processed in the past by slowly adding the contaminated waters to a waste stream effluent so that the level of toxic component is diluted below that which is detrimental to the biological system. This method suffers from the disadvantage of being slow and inconvenient and is subject to the danger of at times exceeding the toxic limit of the contaminant, because of metering problems, thereby upsetting the operation of the treatment plant. The required dilution may also involve recycle of previously treated wastewater adding significantly to the hydraulic flow and hence to the cost of the biological treatment plant.

SUMMARY OF THE INVENTION

A method of disposal of wastewaters containing alpha,beta-ethylenically unsaturated aldehydes or ketones containing 3 to about 10 carbon atoms has been developed which comprises contacting said wastewaters with sufficient base to render the pH of the wastewaters alkaline, maintaining the alkaline wastewaters at a temperature of about 25° to 100°C for at least about 15 minutes and then degrading the wastewater in a biological system containing active biomass.

DESCRIPTION OF THE INVENTION

Although the method outlined above is particularly preferred for use with wastewaters containing acrolein as the alpha,beta-ethylenically unsaturated aldehyde, it is equally useful for other aldehydes such as methacrylaldehyde, crotonaldehyde, 2,4-hexadienal, 2-ethylcrotonaldehyde, and the like as well as alpha,beta-ethylenically unsaturated ketones such as methyl vinyl ketone, and the like.

Although it is not critical what base one uses to render the pH of the wastewaters alkaline, it is preferred to use an alkali metal hydroxide such as potassium hydroxide, sodium hydroxide, or lithium hydroxide. Other bases which can be used include alkaline earth hydroxides, such as, calcium hydroxide, barium hydroxide, strontium hydroxide, and the like; alkali metal alkoxides such as sodium ethoxide, potassium methoxide, sodium propoxide, and the like; quaternary ammonium hydroxides, such as, benzyltrimethylammonium hydroxide, and the like; ammonium hydroxide; soluble organic amines such as methylamine, ethylamine, dimethylamine, triethylamine, and the like; and alkanolamines including monoalkanolamines, dialkanolamines, trialkanolamines, N-monoalkylalkanolamines, and N,N-dialkylalkanolamines, and the like.

It is not necessary to specify the ratio of base to wastewater or the concentration of base, since this will depend upon the pH to be obtained in the treated wastewater. Any pH above 7.0 will give the desired results. It is preferred to use a range of about 8 to 9 although higher pH's can be used if desired.

Although temperatures in the range of about 25° to 100°C. can be used in this invention, it is preferred to use a range of about 80° to about 100°C. Where ambient temperatures of about 25° to 30°C. are used longer contact times with the base are required.

The contact time during which the wastewaters are held at an alkaline pH prior to degradation in the biological system is not narrowly critical but for economic reasons it is preferred to keep this time to a minimum. It is preferred in order to insure complete detoxification of the alpha,beta-ethylenically unsaturated aldehydes or ketones that the contact time between the wastewater and the base be in the range of about 15 minutes to about 30 hours depending on the temperature of detoxification. It is even more preferred to employ a contact time of about 15 to 30 minutes at temperatures in the range of 80° to 95°C. As indicated above this contact time can be shortened by operating in the higher temperature ranges.

Pressure is not critical and even though atmospheric pressure is preferred for economic reasons subatmospheric as well as superatmospheric pressures can be used if desired.

Although it is known that the treatment of ethylenically unsaturated aldehydes and ketones with base results in their condensation, it was quite unexpected that such treatment affords the conversion of alpha,beta-ethylenically unsaturated aldehydes and ketones which are highly active biologically inhibitory compounds into materials which are readily biodegradable. In general the condensation products obtained have relatively low molecular weights characteristically containing only 5 to 10 monomer units per chain. The exact nature of these products, however is unknown although they still contain both carbonyl and unsaturated functional groups which are apparently the toxic portion of the monomeric unsaturated aldehydes and ketones. Thus, it was a surprising discovery that the condensed unsaturated aldehydes and ketones were readily biodegradable.

The effects of the treatment of the wastewater with base was checked experimentally for the specific aldehyde or ketone originally present by gas chromatography and for the total organics by the chemical oxygen demand (COD) analysis described in detail in the textbook "Standard Methods for the Examination of Water and Wastewater", page 495, Section 220, American Public Health Association, 13th Edition, N.Y.C. (1971). Using sodium hydroxide as base, in almost all instances examined after the treatment with base, the concentrations of the alpha,beta-unsaturated compound was reduced from about 500 to 1000 mg/liter to less than about 20 mg/liter when measured by gas chromatography. On the other hand only a slight decrease in the COD value was found. This analysis indicated that the greater majority of the original organic material in the wastewater was still present after treatment but in a form other than that of the starting unsaturated aldehyde or ketone. After detoxification, samples of wastewaters were tested for biodegradability using the standard Warburg respirometer procedure well known to those skilled in the art and described in "Microbiology for Sanitary Engineers", R. E. McKinney, McGraw Hill Book Company, New York, page 107–111 (1962). The Warburg respirometer test is a classical method for the measurement of biological activity. In general, this test comprises contacting measured amounts of biomass under controlled conditions with wastewater containing organics. Biodegradable material causes an increase in bacterial activity as compared to a Control containing only biomass and nutrient water. This increase in activity results in a greater oxygen uptake in the case of aerobic bacteria and an increase in methane production with anaerobic bacteria, both of which result in a volume change which can be measured by a very sensitive manometer when the system at constant temperature is reset to constant volume. Toxic or inhibitory wastewaters cause a decrease in bacterial activity as compared to the Control. Non-toxic, non-biodegradable materials on the other hand neither increase nor decrease the metabolic activity of the biomass.

The invention is further described in the examples which follow. All parts and percentages are by weight unless otherwise specified.

CONTROLS A and B

Two Control experiments were run by taking untreated wastewater from the oxidation of propylene to acrolein and analyzing them by gas phase chromatography. These two Control samples showed acrolein contents of 310 mg/liter and 390 mg/liter respectively. The first sample was treated under aerobic conditions in a Warburg respirometer using 30% wastewater and the remainder biological solids and nutrient water. The biological solids concentration was about 9,000 mg/liter and was obtained from an activated sludge waste treatment plant. The Warburg test was carried out at 25°C. After 30 hours, 250 ml. of oxygen were taken up compared with a value of 650 ml. of oxygen for the original biological sludge free of wastewater.

The second sample was treated under anaerobic conditions in the Warburg respirometer using 7.5% wastewater concentration in the Warburg flask and the remainder being a digested sludge and nutrient water at a concentration of 2700 mg/liter obtained from the North Charleston, West Virginia Municipal Treatment Plant. The anaerobic test was run at 35°C. and after 30 hours showed 500 ml. of Krebe fluid in contrast with a level of 1100 ml. of Krebe fluid when the test was run in the absence of wastewater.

EXAMPLE 1

A sample of wastewater from the manufacture of acrolein having about 310 mg/liter of acrolein (as measured by gas phase chromatographic analysis) and a pH of about 3 was mixed with 10 percent aqueous sodium hydroxide until the pH of the resultant mixture was about 8.0. An additional quantity of solid sodium hydroxide amounting to 0.1 percent of the total weight of the mixture was then added. The wastewater sample was then heated to and maintained at a temperature of 80° for 15 minutes. The sample was tested again by the gas phase chromatographic procedure and shown to contain less than 10 mg/liter of acrolein. The sample was then treated under aerobic conditions, as in Control A, in a Warburg respirometer using 30 percent wastewater which had been treated with sodium hydroxide and the remainder biological solids and nutrient water. The biological solids concentration was about 9000 mg/liter and was obtained from an activated sludge waste treatment plant. The Warburg test was carried out at 25°C. After 30 hours about 1500 ml. of oxygen were taken up compared with only 250 ml. for the untreated Control. This indicates a greatly enhanced biological activity of the wastewaters treated with sodium hydroxide.

EXAMPLE 2

Wastewaters from the manufacture of acrolein containing about 390 mg/liter of acrolein (as determined by gas phase chromatographic analysis) and having a pH of about 3.0 were mixed with 10 percent aqueous sodium hydroxide until the pH of the resultant mixture was about 8.0. Additional sodium hydroxide then was added amounting to 0.1 percent of the total weight of the mixture. The treated wastewater was heated to and maintained at a temperature of 100°C. for 60 minutes. Analysis by gas phase chromatography indicated that the acrolein level in the treated wastewater was then less than about 10 mg/liter. A sample of this wastewater was exposed under anaerobic conditions in the Warburg respirometer using a 7.5 percent wastewater concentration in the Warburg flask with the remainder of the flask containing nutrient water and a digested sludge at a concentration of 2700 mg. per liter obtained from the North Charleston, West Virginia Municipal Treatment Plant. The anaerobic test was run at 35°C. and after 30 hours showed an increase about 2000 ml. of Krebe fluid (a measure of methane production) in contrast with the level of 500 ml. of Krebe fluid when the anaerobic test was run on the untreated wastewater.

Both the aerobic and anaerobic tests described in Examples 1 and 2 clearly demonstrate that the acrolein wastewaters treated with sodium hydroxide and heated were detoxified rendering them readily biodegradable in contrast with the untreated samples which exhibited an inhibitory effect on the bioactivity of a conventional waste treatment plant system containing biomass and nutrient water.

EXAMPLE 3

A synthetic wastewater was prepared containing 900 mg/liter of methacrylaldehyde having a chemical oxygen demand (COD) of 1870 mg/liter. To a 100 ml. aliquot of the synthetic sample was added 0.5 grams of sodium hydroxide. This mixture was heated at 80° for 15 minutes. The resultant mixture was subjected to gas phase chromatographic analysis which indicated a concentration of 30 mg/liter of methacrylaldehyde and a COD of 1470 mg/liter. An aerobic Warburg respirometer test of the synthetic wastewater detoxified with sodium hydroxide and of the untreated wastewater was performed using 50 percent concentrations of these synthetic samples in the Warburg flasks. The biological solids were obtained from the waste treatment plant of Union Carbide at Institute, West Virginia. The biological solids concentration in the Warburg flask was 7200 mg/liter and the test was carried out at 25°C. On the basis of the Warburg data and the COD analysis, after 30 hours 12 percent of the organic material derived from the methacrylaldehyde in the treated sample was oxidized. In contrast, the untreated methacrylaldehyde sample was inhibitory having a cumulative oxygen uptake significantly less than that of the treated methacrylaldehyde sample.

EXAMPLE 4

A synthetic wastewater containing 850 mg/liter of crotonaldehyde was prepared having a 1900 mg/liter COD by analysis. To a 100 ml. aliquot was added 0.5 grams of sodium hydroxide. This mixture was heated at 80°C. for 15 minutes. Analysis of the treated material showed a concentration of 10 mg/liter of crotonaldehyde and a 1300 mg/liter COD. Aerobic Warburg respirometer tests on these samples using the same conditions as in Example 3 indicated a 26 percent oxidation of the contained organic material in the treated sample after 30 hours of tests. The untreated crotonaldehyde sample proved inhibitory to a system containing biomass and nutrient water.

EXAMPLE 5

A synthetic wastewater sample containing 890 mg/liter of 2,4-hexadienal and measuring 2200 mg/liter COD was prepared. A 100 ml aliquot of this mixture was treated with 0.5 grams sodium hydroxide at 80°C. for 15 minutes. After treatment with the base, the wastewater was analyzed indicating 30 mg/liter of 2,4-hexadienal and 1470 mg/liter COD. The results of a Warburg respirometer test on the materials using the same conditions as in Example 3 indicated that the organics contained in the treated sample were oxidized to the extent of 25 percent in the 30 hour test period evincing eventual high biodegradability. The untreated 2,4-hexadienal sample was inhibitory to a system containing the same biomass and nutrient water.

EXAMPLE 6

The synthetic wastewater sample used in this test contained 900 mg/liter of 2-ethylcrotonaldehyde and measured 2182 mg/liter COD. To a 100 ml. aliquot was added 0.5 grams of sodium hydroxide. This mixture was heated at 80°C. for 15 minutes and analyzed by gas phase chromatography. Only 30mg/liter of 2-ethylcrotonaldehyde was detected by gas chromatography although the sample still contained 1970 mg/liter COD. The results of the aerobic Warburg respirometer study using the same conditions as described in Example 3 indicated that a 24 percent oxidation occurred in 30 hours of the contained organic material. The untreated 2-ethylcrotonaldehyde sample was inhibitory to a system containing the same biomass and nutrient water.

EXAMPLE 7

A synthetic wastewater was prepared containing 870 mg/liter of methyl vinyl ketone measuring 1810 mg/liter COD. A 100 ml. aliquot of the synthetic sample was treated with 0.5 grams of sodium hydroxide at 80°C. for 15 minutes. Analysis by gas chromatography after treatment showed only 10 mg/liter of methyl vinyl ketone but the sample still contained 1410 mg/liter COD. The results of aerobic Warburg respirometer tests using conditions identical to those in Example 3 indicated that 26 percent of the contained organic material in the treated sample was oxidized in the 30 hour test period. The untreated methyl vinyl ketone sample was inhibitory in an identical Warburg test the same biomass and nutrient water.

Although the invention has been described in its preferred form with a certain degree of particularity, it is understood that the present disclosure of the preferred forms has been made only by way of example and that numerous changes may be resorted to without departing from the spirit and the scope of the invention.

What is claimed is:

1. A method of disposal of wastewaters containing $\alpha,\beta$-ethylenically unsaturated aldehydes selected from the class consisting of acrolein, methacrylaldehyde, crotonaldehyde, 2,4-hexadienal, and 2-ethylcrotonaldehyde or methyl vinyl ketone comprising contacting said wastewaters with sufficient base to render the pH of the wastewaters alkaline, maintaining the alkaline wastewaters at a pH of at least 8 at a temperature of about 25° to 100° C. for at least 15 minutes whereby the $\alpha,\beta$-ethylenically unsaturated aldehydes or methyl vinyl ketone are condensed to higher molecular weight products, and then biologically degrading the waste water in a biological system containing active biomass.

2. Method claimed in claim 1 wherein the $\alpha,\beta$-ethylenically unsaturated aldehyde is acrolein.

3. Method claimed in claim 1 wherein the $\alpha,\beta$-ethylenically unsaturated aldehyde is methacrylaldehyde.

4. Method claimed in claim 1 wherein the $\alpha,\beta$-ethylenically unsaturated aldehyde is crotonaldehyde.

5. Method claimed in claim 1 wherein the $\alpha,\beta$-ethylenically unsaturated aldehyde is 2,4-hexadienal.

6. Method claimed in claim 1 wherein the $\alpha,\beta$-ethylenically unsaturated aldehyde is 2-ethylcrotonaldehyde.

7. Method claimed in claim 1 wherein the wastewaters contain methyl vinyl ketone.

8. Method claimed in claim 1 wherein the temperature is about 80° to about 100°C.

9. Method claimed in claim 1 wherein the time is about 15 to about 30 minutes and the temperature is about 80° to 95°C.

10. Method claimed in claim 1 wherein the base is an alkali metal hydroxide.

11. Method claimed in claim 10 wherein the alkali metal hydroxide is sodium hydroxide.

* * * * *